Aug. 29, 1967 — J. L. GROVE — 3,338,426
HEAVY DUTY TRUCK CRANE
Filed Sept. 21, 1965 — 3 Sheets-Sheet 1

INVENTOR
JOHN L. GROVE
BY
ATTORNEY

Aug. 29, 1967    J. L. GROVE    3,338,426
HEAVY DUTY TRUCK CRANE
Filed Sept. 21, 1965    3 Sheets-Sheet 2
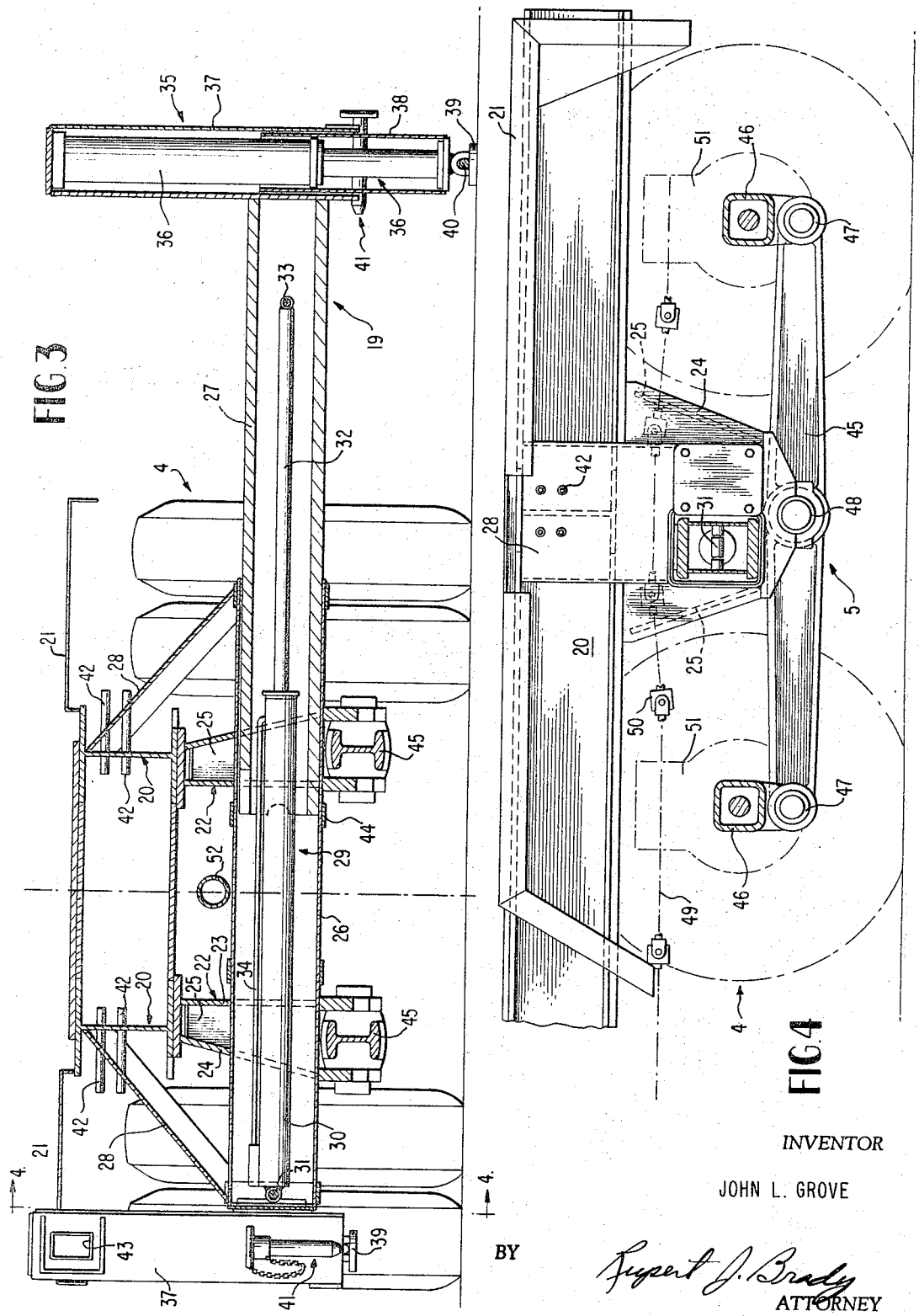
INVENTOR
JOHN L. GROVE
BY
Rupert J. Brady
ATTORNEY

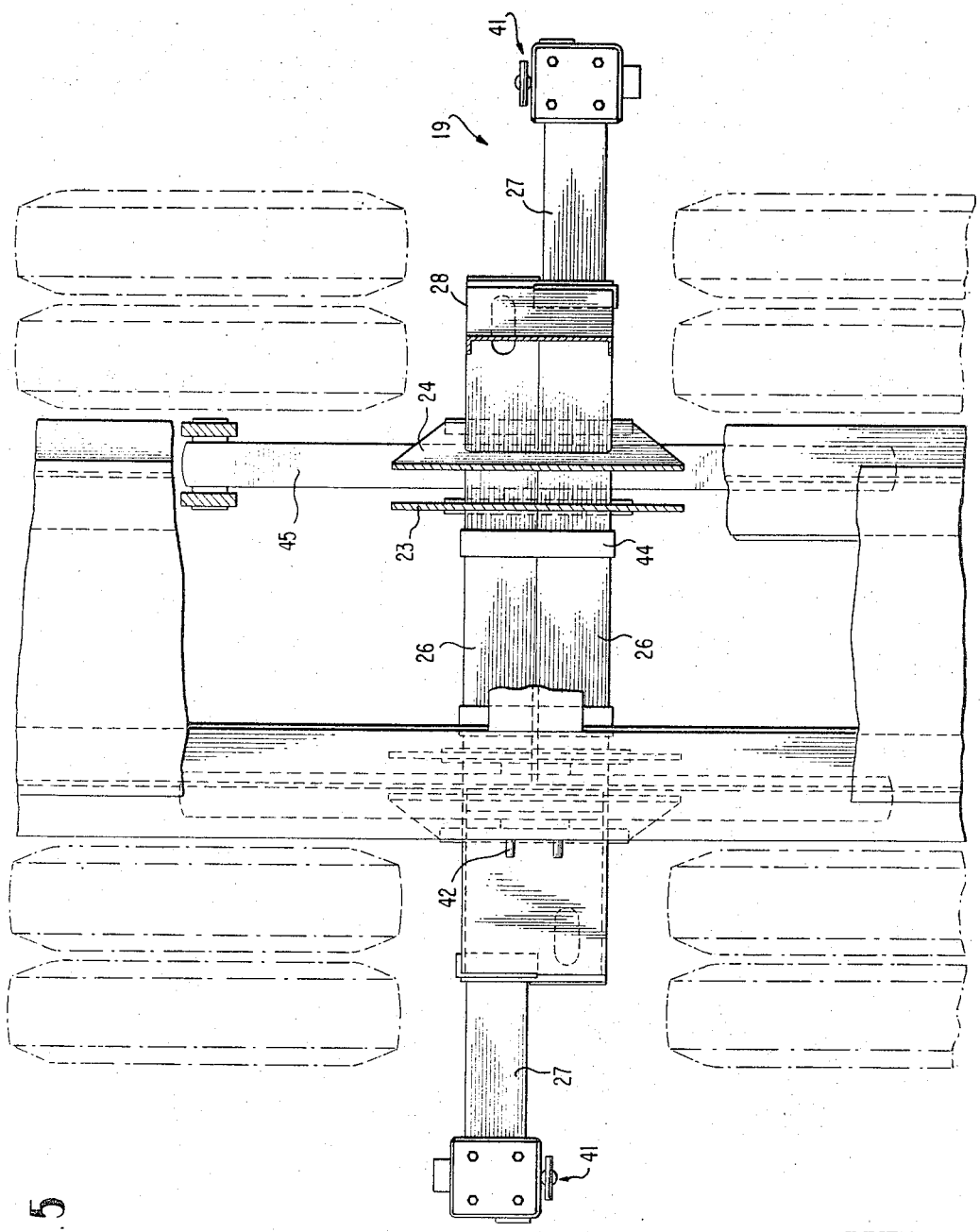

United States Patent Office 3,338,426
Patented Aug. 29, 1967

3,338,426
HEAVY DUTY TRUCK CRANE
John L. Grove, Greencastle, Pa., assignor to Grove Manufacturing Co., Shady Grove, Pa., a corporation of Pennsylvania
Filed Sept. 21, 1965, Ser. No. 488,846
4 Claims. (Cl. 212—145)

This invention relates to a heavy duty truck crane, and more particularly to a truck crane stabilizing assembly wherein the truck wheels, outriggers and center of rotation of the crane table are constructed and arranged to provide a rear tilt axis which is the same with respect to the rear wheels and outriggers, whereby a predetermined load can be lifted over the rear of the truck with only the truck wheels supporting the crane, which load, heretofore could be lifted only when the outriggers engaged the ground to support the crane.

Heretofore various types of truck cranes have been proposed wherein the crane is supported on the vehicle chassis frame in proximity to the rear axle and ground engaging outriggers are provided for supporting the crane when lifting relatively heavy loads at the job site. The crane is customarily mounted on the vehicle frame so that its center of gravity is positioned to give the best stability when employing the outriggers. Accordingly, the outriggers are mounted on the truck frame rearwardly of the rear wheels so that the distance between the center of gravity of the crane and the rear wheels is substantially less than the distance from the outriggers to the center of gravity of the crane. Because of this arrangement, only light loads can be lifted over the rear of the truck when only the truck wheels are supporting the crane, since heavier loads cause the vehicle frame to tilt, resulting in a lifting of the forward portion of the truck.

After considerable research and experimentation, the heavy duty truck crane of the present invention has been devised to overcome the above-noted disadvantage experienced in heretofore employed truck cranes, and comprises, essentially, a crane mounted on a truck frame and positioned a predetermined distance forwardly of the truck rear wheels to thereby transfer more weight to the front axle than heretofore carried, whereby the weight of the crane customarily carried by the rear axle is proportionately reduced, so that a relatively heavy load can be lifted over the rear of the truck with only the front wheels supporting the crane. The truck is provided with a rear tandem axle assembly including an equalizing beam having its intermediate portion pivotally connected to the truck frame through a beam-type outrigger assembly mounted on the truck frame and extending transversely thereto in proximity to the medial portion of the equalizing beam. Another outrigger assembly is carried by the truck frame rearwardly of the front wheels of the truck and spaced substantially the same distance from the center of rotation of the revolvable crane platform as the rear outrigger assembly, whereby a relatively heavy load can be lifted when the outriggers are engaging the ground since the load is more evenly distributed through the vehicle frame.

An object of the invention is to provide a heavy duty truck crane wherein the crane is mounted on the truck frame and positioned a predetermined distance forwardly of the truck rear wheels to thereby transfer more of the weight of the crane from the rear axles to the front axle than hitherto carried, whereby a heavier crane can be legally transported on highways having federal, state or local ordinances regulating the weight supported by the rear axle of a vehicle.

Another object of the invention is to provide a heavy duty truck crane wherein the crane is mounted on the truck frame and positioned a predetermined distance forwardly of the truck rear wheels whereby a predetermined load can be lifted over the rear of the truck with only the truck wheels supporting the crane, which load heretofore could be lifted only when the outriggers engaged the ground to support the crane.

Yet another object of the present invention is to provide a heavy duty truck crane having forward and rear outrigger assemblies spaced substantially equidistant from the center of rotation of the revolvable crane platform to thereby more evenly distribute the load being lifted through the truck frame when the outriggers are engaging the ground.

Still another object of the invention is to provide an improved heavy duty truck crane having a rear tandem axle assembly including an equalizing beam having its medial portion pivotally connected to the truck frame through a beam-type outrigger assembly extending transversely to the truck frame and positioned in proximity to the medial portion of the equalizing beam.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions which, for the purpose of explanation, have been made the subject of illustration.

In the drawings:

FIG. 3 is an enlarged sectional view taken along line 3—3 of FIG. 2;

FIG. 4 is a view taken along line 4—4 of FIG. 3; and

FIG. 5 is an enlarged fragmentary top plan view partially in section, showing the rear outrigger assembly illustrated in FIG. 3.

Figures 1, 2:
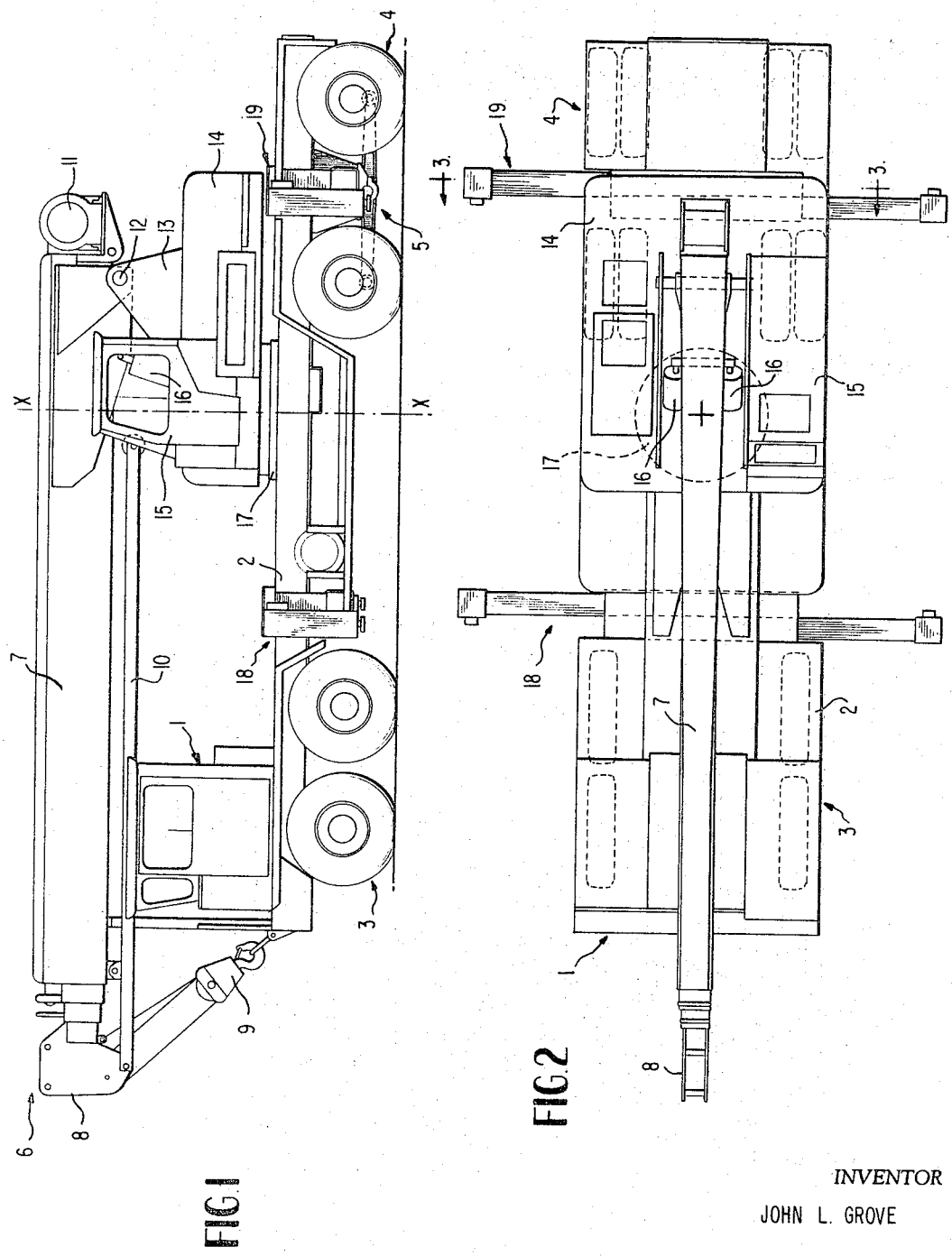
FIG. 1 is a side elevational view of the heavy duty truck crane of the present invention.
FIG. 2 is a top plan view of the crane illustrated in FIG. 1, showing the outriggers in extended position.

Referring to the drawings, and more particularly to FIGS. 1 and 2, the heavy duty truck crane of the present invention comprises a vehicle 1 including a frame 2 supported by front and rear tandem wheel assemblies 3 and 4, respectively, the rear tandem wheels being connected to the truck frame through a walking beam assembly 5, to be described more fully hereinafter.

A crane assembly 6 is carried by the truck and includes a telescopic boom section 7, a boom nose 8, hook assembly 9, extensible jib 10 and a cable winch 11. The crane assembly is pivotally mounted as at 12 to a pair of supports 13 secured to a housing 14 which includes an operator's cab 15 and a hydraulic control system for the crane, the raising and lowering of the crane being effected by means of a pair of hydraulic cylinders 16 operatively connected to the crane and housing 14. The housing 14, cab 15, and associated crane assembly 6 are connected to the truck frame through a turntable 17 having its axis of rotation along line X—X (FIG. 1), whereby the cab, housing and associated crane are rotatable through 360°.

A pair of hydraulically extensible outriggers 18 are mounted on the vehicle frame aft of the front wheels 3 and a similar pair of outriggers 19 are mounted on the rear of the vehicle between the rear tandem wheels 4, whereby the vehicle frame may be stabilized and the load removed from the wheels when a relatively heavy load is to be lifted by the crane.

In connection with the mounting of the crane on the vehicle frame, the axis of rotation, X—X, of the crane assembly is positioned a predetermined distance forwardly of the vehicle rear wheels to thereby transfer more weight to the front axles than heretofore carried, whereby the weight of the crane customarily carried by the rear axles is proportionately reduced. By this construction and arrangement, a relatively heavy load can be lifted by the crane over the rear of the truck with only the wheels supporting the crane, which load, heretofore, could be lifted only when the outriggers engaged the ground to support the crane. Furthermore, by reducing the amount of weight carried by the rear axle of the truck, a heavier crane can be legally transported on highways having federal, state or local ordinances regulating the weight supported by the rear axle of a vehicle. Also, the front and rear outrigger assemblies are substantially equidistant from the center of rotation of the crane turntable whereby stresses and strains imparted by a load being lifted may be evenly distributed through the vehicle frame when the outriggers are engaging the ground.

As will be seen in FIGS. 3 and 4, the truck frame 2 includes a pair of longitudinally extending I-beams 20, the upper flanges of which support the truck fenders 21 and the bed of the vehicle, with the lower flanges of the I-beams having hanger assemblies 22 depending therefrom. Each hanger assembly comprises a vertically extending plate member 23 and inclined gusset plate 24 interconnected by a pair of transversely extending plates 25 to thereby form a housing for supporting the oppositely extending outrigger assemblies 19.

Each outrigger comprises a pair of transversely extending beams 26 and 27, of rectangular cross section, beam 27 being telescopically received within beam 26 which extends between the hanger assemblies 22 disposed on opposite sides of the truck. The plates 23 and 24 are provided with suitable openings for receiving beams 26 and inclined strut members 28 are secured to each end of beams 26 and extend upwardly to the upper flanges of the I-beams 20, whereby the beams 26 are rigidly held within the hanger assemblies 22.

Each beam 27 is moved horizontally relative to the corresponding beam 26 by means of a hydraulic ram assembly 29 comprising, a cylinder 30 mounted within beam 26 and having one end pivotally secured as at 31 to one end of the beam 26. A piston rod 32 extends outwardly from the opposite end of the cylinder and has its terminal end pivotally secured to beam 27 as at 33. Conduits 34 are provided for supplying hydraulic fluid to the cylinder 30, whereby beam 27 may be extended or retracted relative to beam 26.

To complete the outrigger assembly, a vertically extending hydraulic jack 35 is secured to the terminal end of beam 27 and includes a hydraulic ram 36 enclosed within telescopic cylinders 37 and 38. A base member 39 is secured to the lower end of cylinder 38 through a universal joint 40 to provide a level support for the outrigger assembly when the vehicle is positioned on uneven terrain and a detent 41 is provided which is adapted to extend through the cylinder 38 and abut the end of cylinder 37 to maintain the jack at the desired extended position and to relieve excessive pressure from the hydraulic fluid system when the outriggers are in operative position supporting the vehicle. When the outriggers are retracted to inoperative position the detents 41 are releasably carried by the cylinders 37. Hydraulic fluid is supplied to the jacks 35 through suitable flexible conduits (not shown) which are adapted to extend through tubes 42 secured to the web portion of I-beams 20 and struts 28, the flexible conduits extending through an opening 43 formed in the upper end of cylinder 37 and being connected to the hydraulic ram 36.

As will be seen in FIGS. 2 and 5, the front outrigger assemblies consist of oppositely extending beams and associated hydraulic jacks similar in construction to the rear outriggers, as described hereinabove. Therefore, a detailed description of the front outrigger assemblies is not necessary; suffice it to say that both front and rear stationary beams 26 are rigidly secured to the vehicle frame and are held in juxtaposition by suitable strap means 44.

The rear tandem axles are of the Tractioneer type manufactured by the FWD Corporation and include an equalizing beam 45 having its opposite ends pivotally connected to the tandem axles 46 through rubber bushings 47, the substantially medial portion of the beam being pivotally connected to the rear outrigger assembly through the lower end of the hanger assembly 22 by means of rubber bushing 48.

The vehicle drive shaft 49 having suitable universal joints 50 is connected to the tandem differentials 51 and is housed within a longitudinally extending tube 52 positioned above the rear stationary beams 26.

By the construction and arrangement of the hanger assemblies 22, the rear outrigger assemblies 19 can be mounted on the truck in substantial alignment with the medial portion of the equilizing beams through which the rear tilt axis extends; thus the center axis of the rear outriggers and the medial portion of the equalizing beams are substantially coincident and are substantially the same distance from the center of gravity of the crane, whereby a relatively heavy load, which could heretofore be lifted only when the outriggers were in extended operative position, can be lifted with only the wheels supporting the crane. With the revolvable crane positioned to more evenly distribute the load being lifted to the outriggers, when in extended position, the twist which is usually developed in the vehicle frame, when a load is lifted over the side of the vehicle, is diminished, and the diminishing of this normally-present twisting effect, during the lifting operation, enables a greater load to be lifted by the crane over the side of the vehicle than has heretobefore been possible in the art. Although the crane is connected to rotate 360° on the truck chassis, for safety reasons, loads are usually not lifted over the vehicle cab. Also, when the vehicle is supported only by the wheels, the truck frame members 20 can be overstressed if too great a load is lifted over the front of the vehilce due to the length of the lever arm between the center of rotation of the crane and the front wheels. With the construction set forth in the present invention it has been found that a predetermined load can be lifted further forward than in prior crane designs without increasing the strength of the longitudinally extending beams 20, since the distance between the front wheel and the center of rotation of the crane has been diminished. By the term "further forward" is meant an operating position of the crane boom extending toward the front of the vehicle and at an angle to the longitudinal axis of the vehicle. As this forward extending angle of the crane boom diminishes, the crane boom operates "further forward."

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

What I claim as new and desire to secure by Letters Patent of the United States, is as follows:

1. A heavy duty truck crane of the character described comprising a truck chassis, a crane assembly mounted on the truck chassis, forward and rear outrigger assemblies secured to the chassis for supporting the crane when lifting a relatively heavy load, the truck chassis including a rear tandem axle assembly having an equalizing beam-type suspension system, substantially the medial portion of the equalizing beam being pivotally connected to the rear outrigger assembly, and said rear outrigger assembly being connected to the vehicle chassis in proximity to substantially the medial portion of the equalizing beam.

2. A heavy duty truck crane of the character described comprising, a truck chassis, a crane assembly mounted on the truck chassis, forward and rear outrigger assemblies secured to the chassis for supporting the crane when lifting a relatively heavy load, the truck chassis including a rear tandem axle assembly having an equalizing beam-type suspension system, a depending hanger assembly secured to the truck chassis, substantially the medial portion of the equalizing beam being pivotally connected to the lower end of the hanger assembly, the rear outrigger assembly being secured to the hanger assembly in alignment with substantially the medial portion of the equalizing beam.

3. A heavy duty truck crane according to claim 2, wherein each outrigger assembly comprises a pair of horizontally disposed, oppositely extending, hydraulically actuated beam means, and a vertically extending hydraulic jack means secured to the end portion of each beam means.

4. A heavy duty truck crane of the character described comprising, a truck chassis, a crane assembly mounted on the truck chassis, forward and rear outrigger assemblies secured to the chassis for supporting the crane when lifting a relatively heavy load, said truck chassis including at least a pair of spaced rear axle assemblies, load equalizing suspension means connecting the said pair of spaced rear axle assemblies, said load equalizing suspension means pivotally connected intermediate the ends thereof to said rear outrigger assembly, whereby said rear outrigger assembly is connected to the vehicle chassis intermediate the ends of said load equalizing suspension means.

References Cited
UNITED STATES PATENTS

| | | | |
|---|---|---|---|
| 2,365,169 | 12/1944 | Billings | 212—145 |
| 2,855,111 | 10/1958 | McIntyre | 212—145 |
| 2,891,682 | 6/1959 | Graham | 212—145 |
| 3,184,076 | 5/1965 | Brown et al. | 212—145 |

ANDRES H. NIELSEN, *Primary Examiner.*